United States Patent
Wang et al.

(10) Patent No.: US 11,669,558 B2
(45) Date of Patent: Jun. 6, 2023

(54) ENCODER USING MACHINE-TRAINED TERM FREQUENCY WEIGHTING FACTORS THAT PRODUCES A DENSE EMBEDDING VECTOR

(71) Applicant: Microsoft Technology Licensing, LLC, Redmond, WA (US)

(72) Inventors: Yan Wang, Mercer Island, WA (US); Ye Wu, Bothell, WA (US); Houdong Hu, Redmond, WA (US); Surendra Ulabala, Bothell, WA (US); Vishal Thakkar, Kirkland, WA (US); Arun Sacheti, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1105 days.

(21) Appl. No.: 16/368,798

(22) Filed: Mar. 28, 2019

(65) Prior Publication Data
US 2020/0311542 A1 Oct. 1, 2020

(51) Int. Cl.
*G06N 3/04* (2023.01)
*G06N 5/02* (2023.01)
(Continued)

(52) U.S. Cl.
CPC ........ *G06F 16/3347* (2019.01); *G06F 16/245* (2019.01); *G06F 16/248* (2019.01);
(Continued)

(58) Field of Classification Search
CPC .. G06F 16/245; G06F 16/248; G06F 16/3347; G06F 17/16; G06K 9/325;
(Continued)

(56) References Cited

U.S. PATENT DOCUMENTS 10,956,522 B1 * 3/2021 Jha .................. G06F 16/355
11,216,701 B1 * 1/2022 Sim .................. G06V 30/268
(Continued)

FOREIGN PATENT DOCUMENTS

EP 2060982 A1 5/2009
WO 2008037848 A1 4/2008

OTHER PUBLICATIONS

Huang, Chaochao, Xipeng Qiu, and Xuanjing Huang. "Text classification with document embeddings." Chinese Computational Linguistics and Natural Language Processing Based on Naturally Annotated Big Data. Springer, Cham, 2014. 131-140. (Year: 2014).*
(Continued)

*Primary Examiner* — Kamran Afshar
*Assistant Examiner* — Randall K. Baldwin

(57) ABSTRACT

A computer-implemented technique generates a dense embedding vector that provides a distributed representation of input text. The technique includes: generating an input term-frequency (TF) vector of dimension g that includes frequency information relating to frequency of occurrence of terms in an instance of input text; using a TF-modifying component to modify the term-specific frequency information in the input TF vector by respective machine-trained weighting factors, to produce an intermediate vector of dimension g; using a projection component to project the intermediate vector of dimension g into an embedding vector of dimension k, where k is less than g. Both the TF-modifying component and the projection component use respective machine-trained neural networks. An application performs any of a retrieval-based function, a recognition-based function, a recommendation-based function, a classification-based function, etc. based on the embedding vector.

20 Claims, 7 Drawing Sheets

(51) Int. Cl.
    *G06N 3/045* (2023.01)
    *G06F 16/33* (2019.01)
    *G06F 16/245* (2019.01)
    *G06F 16/248* (2019.01)
    *G06V 20/62* (2022.01)
    *G06F 18/2413* (2023.01)
    *G06F 17/16* (2006.01)

(52) U.S. Cl.
    CPC ........... *G06F 18/2413* (2023.01); *G06N 3/04* (2013.01); *G06N 3/045* (2023.01); *G06N 5/02* (2013.01); *G06V 20/62* (2022.01); *G06F 17/16* (2013.01)

(58) Field of Classification Search
    CPC ...... G06N 3/04; G06N 3/0427; G06N 3/0454; G06N 3/08; G06N 3/022; G06N 20/10; G06N 5/003
    See application file for complete search history.

(56) References Cited

U.S. PATENT DOCUMENTS

| | | | | |
|---|---|---|---|---|
| 2014/0067368 | A1* | 3/2014 | Yih | G06F 16/3338 704/9 |
| 2015/0074027 | A1* | 3/2015 | Huang | G06F 16/951 706/46 |
| 2017/0161919 | A1* | 6/2017 | Schroeder | G06T 7/74 |
| 2019/0012374 | A1* | 1/2019 | Petroni | G06F 16/35 |
| 2019/0163817 | A1* | 5/2019 | Milenova | G06N 20/00 |
| 2019/0294874 | A1* | 9/2019 | Orlov | G06V 30/413 |
| 2019/0294972 | A1* | 9/2019 | Keller | G06N 3/084 |
| 2020/0005247 | A1* | 1/2020 | Randall | G06F 40/20 |
| 2020/0019642 | A1* | 1/2020 | Dua | G06N 3/0472 |
| 2020/0042580 | A1* | 2/2020 | Davis | G06F 16/93 |
| 2020/0133756 | A1* | 4/2020 | Sun | G06F 11/079 |

OTHER PUBLICATIONS

Hu, Houdong, et al. "Web-scale responsive visual search at bing." Proceedings of the 24th ACM SIGKDD international conference on knowledge discovery & data mining. 2018: 359-367 (Year: 2018).*

Yamaui Gonzalez, Alexandra Carolina. Question classification in the medical domain using convolutional neural networks and word embeddings. MS thesis. Technical University of Catalonia, 2018: i-49 (Year: 2018).*

Shimomoto, Erica K., et al. "Text classification based on word subspace with term-frequency." 2018 International Joint Conference on Neural Networks (IJCNN). IEEE, 2018 (Year: 2018).*

Zheng, Xiaolin, et al. "Explore: Explainable item-tag co-recommendation." Information Sciences 474 (Feb. 2019): 170-186. (Year: 2019).*

PCT Search Report and Written Opinion for PCT/US2020/016305, dated May 7, 2020, 16 pages.

Kohonen, et al., "Self Organization of a Massive Document Collection," in IEEE Transactions on Neural Networks, vol. 11, No. 3, May 2000, pp. 574-585.

Devlin, et al., "BERT: Pre-training of Deep Bidirectional Transformers for Language Understanding," arXiv: 1810.048051 [cs.CL], Oct. 11, 2018, 14 pages.

Pennington, et al., "GloVe: Global Vectors for Word Representation," in Proceedings of the 2014 Conference on Empirical Methods in Natural Language Processing, Oct. 2014, pp. 1532-1543.

Li, et al., "Approximate Nearest Neighbor Search on High Dimensional Data—Experiments, Analyses, and Improvement (v1.0)," arXiv:1610.02455v1 [cs.DB], Oct. 8, 2016, 26 pages.

Radford, et al., "Language Models are Unsupervised Multitask Learners," available at <<https://d4mucfpksywv.cloudfront.net/better-language-models/language_models_are_unsupervised_multitask_learners.pdf>>, OpenAI, Feb. 14, 2019, 24 pages.

Radford, et al., "Improving Language Understanding by Generative Pre-Training," available at <<https://s3-US-west-2.amazonaws.com/openai-assets/research-covers/language-unsupervised/language_understanding_paper.pdf>>, OpenAI, Jun. 11, 2018, 12 pages.

"GloVe (machine learning)," available at <<https://en.wikipedia.org/wiki/GloVe_(machine_learning)>>, Wikipedia article, accessed on Mar. 22, 2019, 2 pages.

Mikolov, et al., "Efficient Estimation of Word Representations in Vector Space," arXiv: 1301.3781v3 [cs.CL], Sep. 7, 2013.

"Word2vec," available at <<https://en.wikipedia.org/wiki/Word2vec>>, Wikipedia article, accessed on Mar. 22, 2019, 6 pages.

"Tf-idf," available at <<https://en.wikipedia.org/wiki/Tf%E2%80%93idf>>, Wikipedia article, accessed on Mar. 21, 2019, 7 pages.

"Triplet loss," available at <<https://en.wikipedia.org/wiki/Triplet_loss>>, Wikipedia article, accessed on Mar. 21, 2019, 1 page.

He, et al., "Deep Residual Learning for Image Recognition," arXiv:1512.03385v1 [cs.CV], Dec. 10, 2015, 12 pages.

* cited by examiner

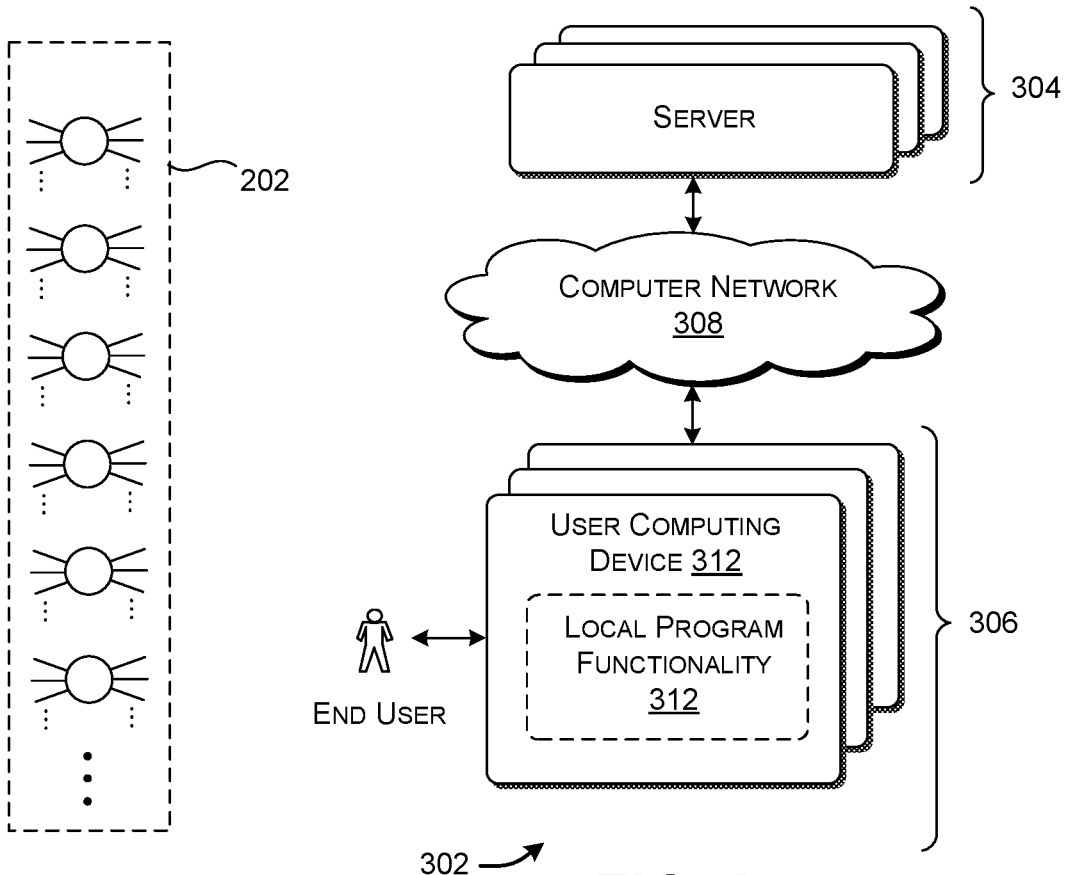
FIG. 2
FIG. 3
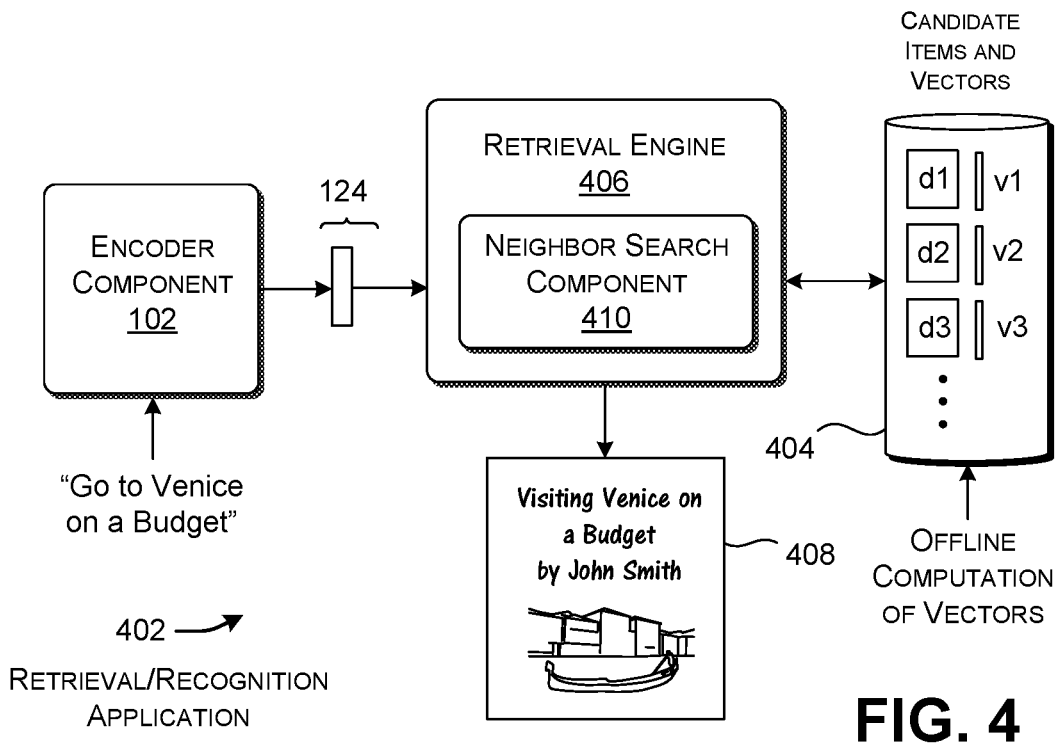
FIG. 4

OVERVIEW OF OPERATION OF THE PRODUCTION ENVIRONMENT
902

RECEIVE AN INSTANCE OF INPUT TEXT IN RESPONSE TO AN ACTION TAKEN BY A USER USING A USER COMPUTING DEVICE.
904

GENERATE AN INPUT TERM-FREQUENCY (TF) VECTOR OF DIMENSION $g$ THAT INCLUDES FREQUENCY INFORMATION RELATING TO FREQUENCY OF OCCURRENCE OF TERMS IN THE INPUT TEXT.
906

USE A TF-MODIFYING COMPONENT TO MODIFY THE FREQUENCY INFORMATION IN THE INPUT TF VECTOR, ASSOCIATED WITH RESPECTIVE TERMS, BY RESPECTIVE MACHINE-TRAINED WEIGHTING FACTORS, TO PRODUCE AN INTERMEDIATE VECTOR OF DIMENSION $g$.
908

USE A PROJECTION COMPONENT TO PROJECT THE INTERMEDIATE VECTOR OF DIMENSION $g$ INTO AN EMBEDDING VECTOR OF DIMENSION $k$, WHERE $k < g$.
910

UTILIZE THE EMBEDDING VECTOR IN AN APPLICATION COMPONENT TO PRODUCE AN OUTPUT RESULT.
912

PROVIDE THE OUTPUT RESULT TO AN OUTPUT DEVICE OF THE USER COMPUTING DEVICE.
914

FIG. 9

OVERVIEW OF OPERATION OF THE TRAINING ENVIRONMENT
1002

COLLECT A PLURALITY OF TRAINING EXAMPLES, THE TRAINING EXAMPLES INCLUDING QUERY ITEMS, POSITIVE ITEMS, AND NEGATIVE ITEMS, WHEREIN EACH POSITIVE ITEM HAS A POSITIVE RELATIONSHIP WITH AN IDENTIFIED QUERY ITEM, AND EACH NEGATIVE ITEM HAS A NEGATIVE RELATIONSHIP WITH AN IDENTIFIED QUERY ITEM
1004

PRODUCE A MACHINE-TRAINED MODEL BY ITERATIVELY DECREASING DISTANCES BETWEEN EMBEDDING VECTORS ASSOCIATED WITH QUERY ITEMS AND THEIR ASSOCIATED POSITIVE ITEMS, AND ITERATIVELY INCREASING DISTANCES BETWEEN EMBEDDING VECTORS ASSOCIATED WITH QUERY ITEMS AND THEIR ASSOCIATED NEGATIVE ITEMS
1006

FIG. 10

ENCODER USING MACHINE-TRAINED TERM FREQUENCY WEIGHTING FACTORS THAT PRODUCES A DENSE EMBEDDING VECTOR

BACKGROUND

A text-processing engine commonly uses an encoder to convert input text into an embedding vector. The embedding vector captures features associated with the input text. The text-processing engine then uses the embedding vector to perform some application task, such as retrieving information based on the submission of a query.

SUMMARY

A computer-implemented technique is described herein for generating an embedding vector that represents an instance of input text. In one implementation, the technique includes: generating an input term-frequency (TF) vector of dimension g that includes frequency information relating to the frequency of occurrence of terms in the input text; using a TF-modifying component to modify the term-specific frequency information in the input TF vector by respective machine-trained weighting factors, to produce an intermediate vector of dimension g; using a projection component to project the intermediate vector of dimension g into a embedding vector of dimension k, where k is less than g; utilizing the embedding vector in an application component to produce an output result; and providing the output result to an output device of a user computing device.

According to one illustrative aspect, the input TF vector is a sparse n-hot vector that includes a dimension for each term in the input text (e.g., in one non-limiting case, g=10,000), while the embedding vector is a dense vector that provides a distributed compact representation of semantic information in the input text (e.g., in one non-limiting case, k=256). In other words, k<<g.

According to another illustrative aspect, both the TF-modifying component and the projection component are implemented as respective machine-trained neural networks. In one implementation, the TF-modifying component applies a diagonal matrix of weighting factors, while the projection component applies a full matrix of weighting factors.

According to another illustrative aspect, the TF-modifying component applies at least one negative weighting factor, which represents negative emphasis on a corresponding term.

According to another illustrative aspect, the application component can perform any of: a retrieval-based function; a recognition-based function; a recommendation-based function; a classification-based function, etc., or any combination thereof.

According to another illustrative aspect, a training environment produces a machine-trained model used by the TF-modifying component and the projection component. The training environment performs this task by collecting a plurality of training examples. The training examples include query items, positive items, and negative items. Each positive item has a positive relationship with an identified query item, while each negative item has a negative relationship with an identified query item. The training environment then produces the machine-trained model by iteratively decreasing distances between embedding vectors associated with query items and their associated positive items, and iteratively increasing distances between embedding vectors associated with query items and their associated negative items.

One technical merit of the technique is that it produces embedding vectors that various applications can use to produce good information retrieval performance; at the same time, the embedding vectors exhibit good semantic awareness. Another technical merit is that it produces embedding vectors that allow an application to deemphasize the presence of terms in input text. Another technical merit is that it produces embedding vectors that capture the relationships of terms in the input text. Another technical merit is that it produces dense embedding vectors. This last characteristic allows the embedding vectors to be readily combined with dense vectors produced by other machine-trained models, such as machine-trained image-based encoder components which produce dense image-based vectors.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows a representative layer of neurons in a neural network.

FIG. 3 shows illustrative computing equipment for implementing the computing environment of FIG. 1.

FIG. 4 shows a first application of the encoder component of FIG. 1 that performs a retrieval function.

FIG. 9 is a flowchart that shows one illustrative manner of operation of a production environment shown in FIG. 1.

FIG. 10 is a flowchart that shows one illustrative manner of operation of the training environment shown in FIG. 1.

Figure 1:
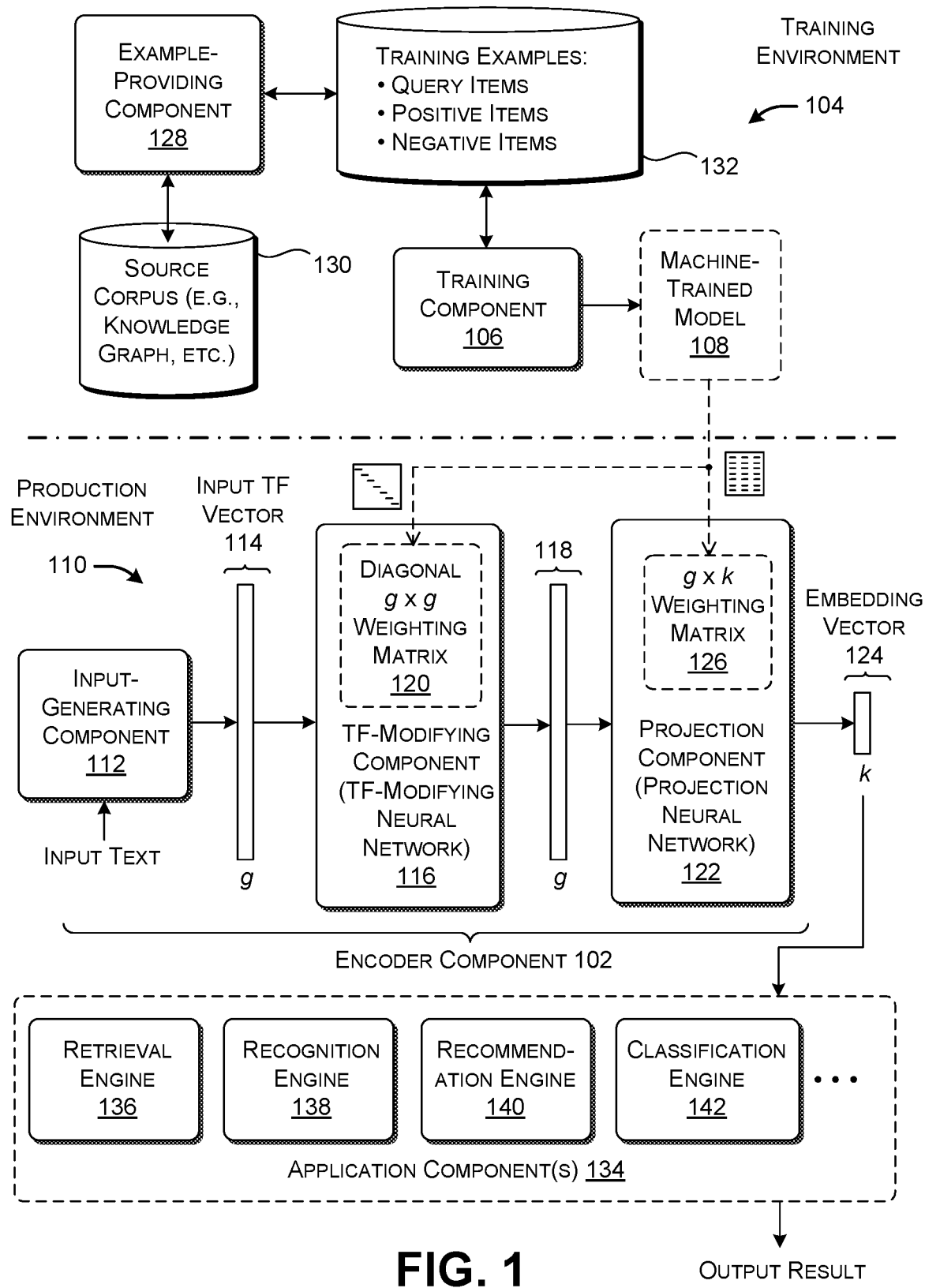
FIG. 1 shows an illustrative computing environment for training and applying an encoder component.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing environment for training and applying an encoder component. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds, at least in part, to one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview

There are a number of technical challenges associated with the operation of converting text information into embedding vectors. In some cases, an encoder may map two instances of text into dense embedding vectors that are close to each other in a dense semantic vector space (as gauged by any metric of vector similarity, such as cosine similarity). For example, an encoder may map the words "apple" and "orange" into nearby embedding vectors, since both words refer to fruit. But a user who is searching for an apple is unlikely to be interested in information regarding an orange, and vice versa. For this reason, a retrieval engine that leverages these kinds of embedding vectors may exhibit poor retrieval performance. Other types of embedding vectors offer better retrieval-based performance. In some cases, however, these embedding vectors may correspond to sparse high-dimensional information. It is challenging to utilize this kind of high-dimensional information in some downstream application tasks that use machine learning, particularly in the case in which a downstream application task combines two or more embedding vectors produced by different encoder components, some of which may be dense.

FIG. 1 shows an overview of a computing environment for training and applying an encoder component 102 that addresses at least the above technical challenges. The computing environment includes a training environment 104 that includes a training component 106 for producing a machine-trained model 108. The encoder component 102 operates based on weighting factors (also referred to as weight values or weights) provided by the machine-trained model 108. The computing environment also includes a production environment 110 which applies the encoder component 102 in various application scenarios. This subsection provides an overview of the computing environment as a whole. Subsection A.2 provides further information regarding illustrative applications of the encoder component 102. And Subsection A.3 provides further information regarding the training environment 104.

The encoder component 102 itself includes an input-generating component 112 for receiving an instance of input text, and for generating an input term-frequency (TF) vector 114 of dimension g based on the input text. As will be clarified in the next subsection, the input text may originate from different sources. For example, input-generating component 112 can receive input text that a user manually supplies using an input device, such as a key input device or a touch-sensitive surface. Or the input-generating component 112 can receive input text that the user manually selects, e.g., by selecting a portion of a preexisting document. Or the input-generating component 112 can receive input text extracted from an image by an optical character recognition component, and so on. These examples are mentioned by way of illustration, not limitation; the input-generating component 112 can receive input text from yet other sources.

Each dimension of the input TF vector 114 corresponds to a term in a vocabulary of size g. To facilitate explanation, assume that each term corresponds to a complete word in the vocabulary, such as the words "apple," "orange," etc. In another implementation, a term corresponds to a unique letter-n-gram in the vocabulary (such as the three-letter combination "app" used in the word "apple," "application," "appear," etc.). The input-generating component 112 operates by setting a value in each dimension of the input TF vector 114 based on the number of times that the term associated with that dimension appears in the input text. For example, assume that the input text corresponds to the book title "Visiting Venice on a Budget." The input-generating component 112 operates by setting a non-zero value for in the input TF vector 114 for each of the words in the title, and a zero value for other dimensions. The input TF vector 114 is therefore a sparse high-dimensional p-hot vector. An n-hot vector is a vector that devotes a dimension per variable to be described in the input information, any of which may be non-zero (hot) for a particular instance of input information.

Different implementations can use different algorithms to generate each value in the input TF vector 114. In one case, the input-generating component 112 computes a normalized value by dividing the number of times a particular term appears in the input text, divided by the total number of terms in the input text. Alternatively, or in addition, the input-generating component 112 can apply a weighting factor to each value. For example, take the case in which the input text originates from an image of a book title. The input-generating component 112 can modify the count value associated with a term by a weighting factor that depends on the size of the font in which that term appears in the image. This will have the effect increasing the relevance of a term in proportion to its size in the image. For example, this will have the effect of emphasizing large-sized words that appear in the title of a book compared to smaller-sized publisher-related information which also appears on the cover of the book.

A term-frequency-modifying (TF-modifying) component 116 next multiples each TF value ($TF_i$) of the input TF vector 114 by a respective machine-trained weighting factor ($w_i$), to produce an intermediate vector 118 of size g. That is, the intermediate vector 118 has values given by $[TF_1w_1, TF_2w_2, TF_3w_3 \ldots ]^T$. In one implementation, the encoder component 102 implements the TF-modifying component 116 using a neural network that performs a linear transformation using a single layer of fully-connected neurons. The neural network operates by multiplying the input TF vector 114 by a diagonal weighting matrix 120 of size g×g. This diagonal matrix includes weighting factors associated with respective dimensions of the input TF vector 114 along its diagonal, and 0 values at other positions. Note that although the neurons in the neural network are fully connected, each TF value will be modified by a single weighting factor by virtue of the fact that the diagonal weighting matrix 120 includes non-zero weighting factors only along its diagonal. In another implementation, the TF-modifying component 116 modifies the TF values in the input TF vector 114 in an element-wise manner, without the use of a diagonal matrix 120. In still other cases, the TF-modifying component 116 can use a neural network that applies a matrix that includes non-zero weighting factors at positions other than its diagonal. Note that the intermediate vector 118, like the input TF vector 114, is an p-hot sparse vector. In those implementations in which the TF-modifying component 116 is implemented by a neural network, it is also referred to herein as a TF-modifying neural network.

For frame of reference, note that retrieval engines that rely on TF-IDF (term-frequency inverse-document-frequency) features also operate by multiplying each TF value by another value, in this case, an IDF value. But these retrieval engines compute the IDF value in a handcrafted algorithmic manner. That is, most commonly, these retrieval engines compute an IDF value by dividing the total number (N) of documents in a corpus by the number ($N_t$) of documents in the corpus that contain the term under consideration (e.g., $IDF=\log(N/(1+N_t))$). In contrast, the TF-modifying component 116 of the encoder component 102 applies weighting factors that are learned by the training component 106 based on empirical data.

Further, the TF-modifying component 116 can potentially generate negative-value weighting factors, whereas IDF values, as defined above, cannot be negative. A downstream retrieval engine can rely on negative weighting factors to deemphasize terms in input text. For example, assume that the user inputs the book title "Visiting Venice on a Budget" with the intent of locating a product page associated with this book. But assume that there is another book with a very close title that reads, "Venice on a Shoestring Budget." Finally assume that the TF-modifying component 116 applies a negative weighting factor to the term "Shoestring" based on prior training which attempts to distinguish between the phrases "Budget" and "Shoestring Budget" in titles. The downstream retrieval engine can leverage this negative weighting factor (and the embedding vector 124 produced thereby) by appropriately deemphasizing the book title "Visiting Venice on a Shoestring Budget." This will prompt the retrieval engine to identify the title "Visiting Venice on a Budget" as the best-matching title.

Next, a projection component 122 (also referred to herein as a projection neural network) uses another neural network to map the intermediate vector 118 into an embedding vector 124 of size k. It one implementation, the projection component 122 achieves this result by applying a machine-trained full matrix 126 of size g×k. That is, the full matrix 126 includes non-zero weighting factors interspersed throughout its rows and columns, not just in the diagonal positions. In one implementation, k is much smaller than g (k<<g), making the embedding vector 124 a dense representation of the input text. For example k may correspond to 256, while g is 10,000. The embedding vector 124 is also a distributed compact representation of semantic information expressed in the input text because plural dimensions of the embedding vector 124 combine to express the meaning of the input text. This is in contrast to an n-hot representation, which devotes a dimension per variable to be described. The conversion of high-dimensional data to lower-dimensional data is desirable because it provides a way of concisely grouping together similar concepts in a semantic vector space, such as the terms "robot" and "android." It also enables downstream application components to more readily combine this information with other dense embedding vectors produced by other encoder components, as will be described more fully below in Subsection A.2

Further, because the projection component 122 uses a fully-connected neural network, the value of any dimension of the embedding vector 124 depends on the values of plural dimensions of the intermediate vector 118. This characteristic, in turn, allows the encoder component 102 to take into consideration relations between different terms in the input text. In contrast, a traditional TF-IDF feature depends on a single term in isolation.

A retrieval engine that leverages the embedding vector 124 can produce more reliable results compared to an engine that uses a traditional TF-IDF vector (which is composed of TF-IDF values). For example, in an n-letter-gram arrangement, a retrieval engine that uses a traditional TF-IDF vector may have difficultly adequately distinguishing the word "smile" from "mile." The encoder component 102 of FIG. 1, by contrast, uses machine-learned weights based on empirical data, and therefore would exhibit better semantic awareness of the difference between these two terms.

Now referring to the training environment 104, an example-providing component 128 generates a corpus of training examples based on a source corpus provided in a data store 130. In one non-limiting implementation, the source corpus corresponds to information provided in a relational knowledgebase. The relational knowledgebase includes a plurality of nodes that represent entities and a plurality links between nodes that represent relationships among the entities. The example-providing component 128 stores the training examples it generates in a data store 132. The training examples include query items, positive items, and negative items.

More specifically, consider the merely illustrative case in which the relational knowledgebase provides information regarding books. The example-providing component 128 can select a prescribed number of book titles extracted from the relational knowledgebase as query items. The example-providing component 128 can choose a positive item with respect to a given query item by finding a book title that the relational knowledgebase identifies as having a positive relationship with the query item. For instance, the query item and the positive item may derive from two images of the same book cover. The example-providing component 128 can choose a negative item with respect to given query item by finding a book title that the relational knowledgebase identifies as having a negative relationship with the query item. For instance, these two items may derive from respective images of different books. Subsection A.2 elaborates on this operation.

As will also be described in Subsection A.2, the example-providing component 128 can improve training by selecting negative items that are close to their respective query items, but are still not considered matches of those query items. That is, by including these "hard" negative items, the training component 106 is forced to learn weighting factors that enable detection of subtle distinctions among book covers.

The training component 106 produces the machine-trained model 108 by iteratively decreasing distances between query items and their respective positive items, while increasing distances between query items and their respective negative items. The resultant machine-trained model 108 provides dense distributed encoding vectors in a semantic space, which allows it to detect similarities between related words (such as "robot" and "android"). At the same time, by virtue of the TF-modifying component 116, the machine-trained model 108 provides good retrieval performance. For instance, the machine-trained model 108 will not offer information regarding an "orange" when it is apparent that the user is attempting to find information regarding an "apple." In brief, the machine-trained model 108 offers semantic awareness while accurately gauging the user's retrieval-based intent.

FIG. 1 also introduces a collection of application components 134 that will be explained in greater detail in the next subsection. Each of these application components 134 operates on the embedding vector 124 to achieve an application-specific goal. For instance, a retrieval engine 136 uses the embedding vector 124 to identify a candidate item that has a prescribed degree of similarity to the input text. For example, the retrieval engine 136 can identify a product page that is associated with a product described by the user in the input text. (As used herein, a "product" broadly refers to any entity associated with a thing or service, not limited to commercial products or services.) A recognition engine 138 uses the embedding vector 124 to determine the identity of a product associated with the input text. For example, the recognition engine 138 can inform the user that the input text that they have identified corresponds to a particular product name or kind. A recommendation engine 140 uses the embedding vector 124 to identify a product that is complementary to the product described by the user in the input text. Each of the above-described engines (136, 138, 140) performs its operations using a retrieval-based function. That task entails finding one or more candidate items that have embedding vectors that have a prescribed relation to the input embedding vector 124.

A classification engine 142 uses the embedding vector 124 to classify the input text. For example, the classification engine 142 can use the embedding vector 124 to determine whether an image associated with the input text shows a book cover. The classification engine 142 performs this function without necessarily using a retrieval function.

FIG. 2 shows an example of a layer 202 of neurons in a neural network. In the fully-connected case, each neuron in a layer j is connected to each neuron in the preceding layer j−1, or each dimension of an input vector (for the case in which j=1). More specifically, in the most general case, the layer 202 produces output values $z_j$ given by the formula $z_j = f(W_j z_{j-1} + b_j)$, for j=2, . . . N. The symbol $W_j$ denotes a machine-learned weight matrix for the layer j, and the symbol $b_1$ refers to a machine-learned bias vector for the layer j. The activation function $f(\bullet)$ can be formulated in different ways, such as the tanh function or the sigmoid function. In one implementation, both the TF-modifying component 116 and the projection component 122 use a single-layer neural network that does not use a non-linear activation function. One technical merit of this neural network design is that it allows the training component 106 to train the machine-learned model 108 in an efficient manner. The layer 202 of the neural network is implemented by the hardware logic circuitry described in Section C.

FIG. 3 shows computing equipment 302 that can be used to implement the computing environment of FIG. 1. The computing equipment 302 includes one or more servers 304 coupled to one or more user computing devices 306 via a computer network 208. The user computing devices 306 can correspond to any of: desktop computing devices, laptop computing devices, handheld computing devices of any types (smartphones, tablet-type computing devices, etc.), mixed reality devices, game consoles, wearable computing devices, intelligent Internet-of-Thing devices, and so on. Each user computing device (such as representative user computing device 310) includes local program functionality (such as representative local program functionality 312). The computer network 308 may correspond to a wide area network (e.g., the Internet), a local area network, one or more point-to-point links, etc., or any combination thereof.

The functionality of the computing environment of FIG. 1 can be distributed between the servers 304 and the user computing devices 306 in any manner. In one implementation, the servers 304 implement all functions of the computing environment of FIG. 1. Here, the user uses a browser application provided by a user computing device to access these functions. In another implementation, each user computing device implements all of the functions of the computing environment of FIG. 1. In another implementation, the servers 304 implement some functions of the computing environment, while each user computing device implements other functions. For example, a local computing device can capture an image of a book cover and extract text from the image. A server can thereafter process the text information identified by the local computing device. A server can also implement the functionality associated with the training environment 104.

A.2. Illustrative Applications

FIG. 4 shows a first application 402 of the encoder component 102. This application 402 operates by retrieving one or more candidate items based on input text, here corresponding to the query "Go to Venice on a Budget." The user can input this text in any manner, such as by manually typing it using an input device, or by manually selecting it (such as by selecting a paragraph or page of a larger document), or by taking a digital photograph of a product that contains the text, etc. The encoder component 102 transforms the input text into an embedding vector 124 in the manner described in Subsection A.1. The embedding vector 124 may be referred to as a query embedding vector in this application context.

In an offline process (not shown), the encoder component 102 can compute embedding vectors for a plurality of candidate items. A data store 404 stores the candidate items along with their respective embedding vectors. Note that all subscripts used in this Detailed Description appear in the drawings as full-sized numerals to facilitate illustration.

A retrieval engine 406 finds one or more candidate items that match the query embedding vector 124. Generally, the retrieval engine 406 compares the query embedding vector 124 to the embedding vector associated with each respective candidate item. The retrieval engine 406 can then select the n candidate items having embedding vectors that are closest to the query embedding vector 124, with respect to any measure of vector similarity (e.g., cosine similarity, etc.). In this merely illustrative case, the retrieval engine 406 provides an output result that shows an image 408 of a book cover that best matches the input text.

In one implementation, the retrieval engine 406 can perform the above operation in a linear manner by comparing the query embedding vector 124 to each embedding vector associated with a candidate item. In another implementation, the retrieval engine 406 can use a neighbor search component 410 to perform this function, e.g., using any type of approximate nearest neighbor (ANN) technique. Examples of ANN techniques include: various kinds of locality-sensitive hashing (LSH) techniques; various tree partition techniques; various neighborhood-based techniques, and so on. One tree-based technique, for example, uses k-means clustering to partition embedding vectors into successively smaller regions. The technique represents these clusters as a hierarchical tree. The neighbor search component 410 finds those embedding vectors that are closest to the query embedding vector 124 by traversing the tree from its root node to its leaf nodes. Background information regarding the general topic of ANN, as applied to general datasets, can be found in Wen Li, et al., "Approximate Nearest Neighbor Search on High Dimension Data—Experiments, Analyses, and Improvement," arXiv: 1610.02455v1 [cs.DB], Oct. 8, 2016, 26 pages.

In the above scenario, the user is interested in retrieving one or more candidate items that most closely match the input text. For example, the user may be interested in accessing a product page associated with a product described by the input text. In another scenario, the user may provide the input text with the objective of determining the identity of a product associated with the input text. In that case, the retrieval engine 406 can perform the same function as described above, but provide an output result that principally attempts to inform the user of the identity of the product that he or she has described. In other words, the functionality shown in FIG. 4 can be used to implement either a retrieval engine or a recognition engine, depending on application context. In the latter case, the application 402 approximates a classification function using a retrieval-based function.

Figure 5:
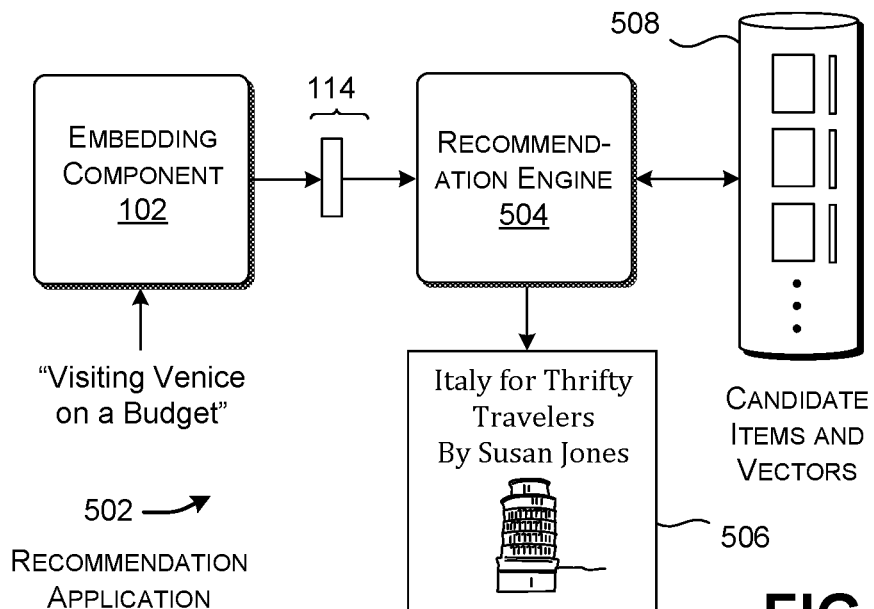
FIG. 5 shows a second application of the encoder component of FIG. 1 that performs a recommendation function.

FIG. 5 shows a second application 502 that uses a recommendation engine 504 to find one or more candidate items that are considered complementary to a product described by the input text. For example, assume that the input text describes a book title "Visiting Venice on a Budget." The recommendation engine 504 identifies an image 506 of a book that is considered related to the book described by the input text, although not the same book as described by the input text.

The recommendation engine 504 operates in the same manner as the retrieval engine 406 of FIG. 4. That is, the recommendation engine 504 finds one or more candidate items in a data store 508 that have embedding vectors which best match the query embedding vector 124, with respect to any metric of vector relatedness (e.g., cosine similarity). And again, the recommendation engine 504 can perform this operation using a linear search algorithm or an ANN technique. FIG. 5 differs from the scenario of FIG. 4 principally because it relies on a machine-trained model that is trained on different training examples compared to the case of FIG. 4. That is, in the case of FIG. 4, the example-providing component 128 deems a query item to be related to a candidate positive item when they pertain to the same item, or a closely related item. In the case of FIG. 5, the example-providing component 128 deems a query item to be related to a candidate positive item when they pertain to complementary items, but not the same item.

Figure 6:
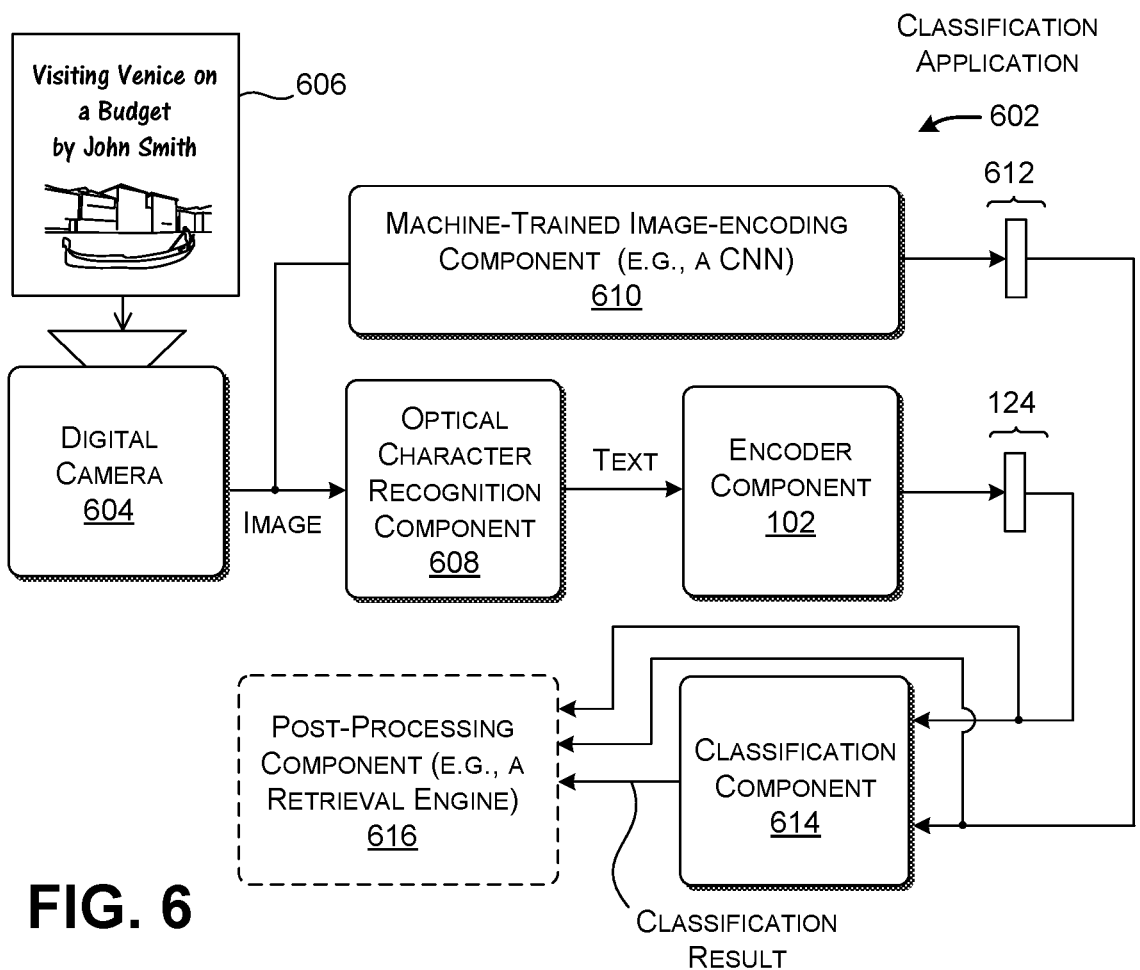
FIG. 6 shows a third application of the encoder component of FIG. 1 that performs a classification function.

FIG. 6 shows a third application 602 of the encoder component 102. In this example, a digital camera 604 takes a digital photograph of a product, here a book cover 606. An optical character recognition component 608 then converts the resultant image into input text. The encoder component 102 next transforms the input text into the embedding vector 124 in the same manner described above.

In a parallel path, a machine-trained image-encoding component 610 converts the image into an image-based embedding vector 612. For example, the image-encoding component 610 can use any type of convolutional neural network (CNN) to perform this task. In general, a CNN performs analysis in a pipeline of stages. One of more convolution stages (not shown) perform a convolution operation on the input image. One or more pooling stages (not shown) perform a down-sampling operation. One or more feed-forward stages (not shown) respectively provide one or more fully-connected neural networks, each including any number of layers. More specifically, a CNN can intersperse the above three kinds of stages in any order. For example, the CNN can include two or more convolution stages interleaved with pooling stages.

In each convolution operation, a convolution stage moves an n×m kernel across an input image (where "input image" in this general context refers to whatever image is fed to the convolutional stage). In one case, at each position of the kernel, the convolution stage generates the dot product of the kernel values with the underlying pixel values of the image. The convolution stage stores that dot product as an output value in an output image at a position corresponding to the current location of the kernel.

More specifically, a convolution stage can perform the above-described operation for a set of different kernels having different machine-learned kernel values. Each kernel corresponds to a different pattern. In early layers of processing, a convolutional stage may apply a kernel that serves to identify relatively primitive patterns (such as edges, corners, etc.) in the image. In later stages, a convolutional stage may apply a kernel that finds more complex shapes (such as shapes that resemble book covers, etc.).

In each pooling operation, a pooling stage moves a window of predetermined size across an input image (where the input image corresponds to whatever image is fed to the pooling stage). The pooling stage then performs some aggregating/summarizing operation with respect to the values of the input image enclosed by the window, such as by identifying and storing the maximum value in the window, generating and storing the average of the values in the window, etc.

A downstream classification component 614 accepts the text-based embedding vector 124 and the image-based embedding vector 612 as input information. For example, the downstream classification component 614 can accept a concatenation of these two embedding vectors (124, 612). The classification component 614 can readily combine these two embedding vectors (124, 612) because they both correspond to dense low-dimensional vectors. For example, in one merely illustrative case, the image-based embedding vector 612 may have a dimension of 512, while the text-based embedding vector 124 may have a dimension of 256.

The classification component 614 can then use any machine-learned model to map the input information into a classification result. In one merely illustrative case, the classification result can provide a first value which corresponds to the probability that the image shows a book cover, and a second value which corresponds to the probability that the image does not show a book cover. In one implementation, the classification component 614 can perform this task using a single-layer neural network. In another implementation, the classification component 614 can perform this operation using an n-layer neural network followed by a Softmax component (corresponding to a normalized exponential function). In other implementations, the classification component 614 can perform its classification operation using a logistic regression model, a support vector machine (SVM) model, a decision tree model, etc.

An optional post-processing component 616 can perform any function based on the classification result. For example, the post-processing component 616 can correspond to the same kind of retrieval engine 406 shown in FIG. 4. For instance, the retrieval engine 406 can identify and retrieve a page associated with the input image of the book cover 606, assuming that the classification component 614 identifies it as a book cover. The retrieval engine 406 also makes use of the text-based embedding vector 124 (and/or the image-based embedding vector 612) in performing its retrieval task. Thus, the third application 602 uses the embedding vector 124 at two stages of its analysis: the image classification stage and the information retrieval stage.

The applications described in this subsection are set forth in the spirit of illustration, not limitation; many other applications are possible. For example, in another application (not shown), a recommendation engine can use the embedding vector 124 associated with a query to find similar queries (having similar embedding vectors). The recommendation engine can then offer those other queries to the user as query suggestions. In another application (not shown), a classification engine can use the embedding vector 124 associated with input text to assess the sentiment expressed by the input text, and so on.

A.3. The Training Environment

As summarized in Subsection A.1, the example-providing component 128 compiles training examples from a source corpus (in a data store 130), and stores these training examples in a data store 132. The training examples include query items, positive items, and negative items.

Figure 7:
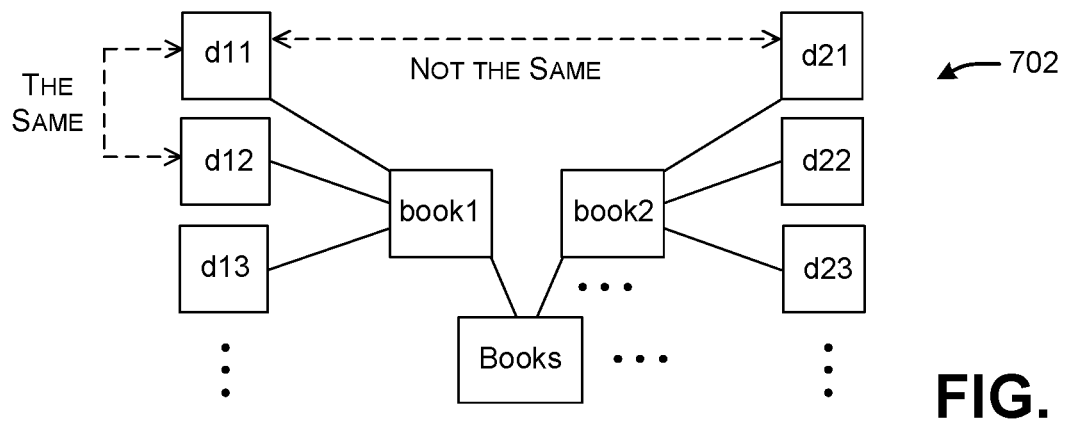
FIG. 7 shows a portion of a knowledgebase that a training environment (of FIG. 1) may mine to collect training examples. The training environment produces the encoder component based on the training examples.

In one implementation, the example-providing component 128 extracts the examples from a relational knowledgebase. FIG. 7 shows a small portion 702 of a representative knowledgebase. That portion 702 includes two book nodes associated with two respective books ($book_1$, $book_2$). Each book node is also linked to a plurality of image nodes associated with images. For example, each book node is linked to image nodes associated with book cover images that represent a same book cover. Based on these relationships, it can be said that two image nodes that link to the same book node are related, while two image nodes that link to different book nodes are not related.

Assume that the example-providing component 128 identifies the image node $d_{11}$ as a query item, e.g., by randomly selecting this node. The example-providing component 128 can identify the image node $d_{12}$ as a positive item because it is linked to the same book as the image node $d_{11}$. It can identify the image node $d_{21}$ as a negative item because it is linked to a different book than the image node $d_{11}$. The example-providing component 128 can collect a plurality of query items, positive items, and negative items by leveraging these types of relationships. The example-providing component 128 can extract text from each of these items using optical character recognition.

The above manner of harvesting training examples is merely illustrative. In another case, the example-providing component 128 can compile training examples based on a click-through log provided by a search engine. In that context, the example-providing component 128 can identify two queries that resulted in clicking on the same URL as a query item and a product item, respectively. The example-providing component 128 can identify two queries that did not result in clicking on the same URL as a query item and a negative item, respectively. More generally, the training environment 104 can be said to provide a supervised training approach because it performs training based on examples having labels applied thereto.

In some implementations, the example-providing component 128 can also identify a subset of negative items that satisfy an additional relevance test, instead of randomly selecting the negative items. For example, the example-providing component 128 can generate a conventional TF-IDF vector for each candidate item. The example-providing component 128 can then consider two candidate items as a good pairing of a query item and a negative item if: (a) there is no nexus between these two items in the relational knowledgebase (if that is the measure of relatedness that is being adopted); and (b) the TF-IDF vectors associated with these two items have a prescribed degree of relatedness (with respect to any measure of vector similarity, such as cosine similarity). Negative items that meet this test are referred to herein as "hard" negative items. By adopting hard negative items, the training component 106 can produce a more robust machine-trained model 108. This is because the training component 106 is forced to handle close cases in which two items have some degree of similarity, but nonetheless do not match.

In another scenario, the example-providing component 128 can use the machine-trained model 108 itself to measure the degree of relatedness between two items, instead of using TF-IDF vectors. For example, the training component 106 can perform a prescribed number of training cycles to produce a partially-trained model. The example-providing component 128 can then use the partially-trained model to find hard negative items, and then use these hard negative items in subsequent training. The example-providing component 128 can perform any number of iterations of these example-mining and training operations.

In one implementation, the training component 106 performs training based on the following triplet loss function:

$$L(q,p,n) = \max(0, |f(q)-f(p)|^2 - |f(q)-f(n)|^2 + \xi).$$

Figure 8:
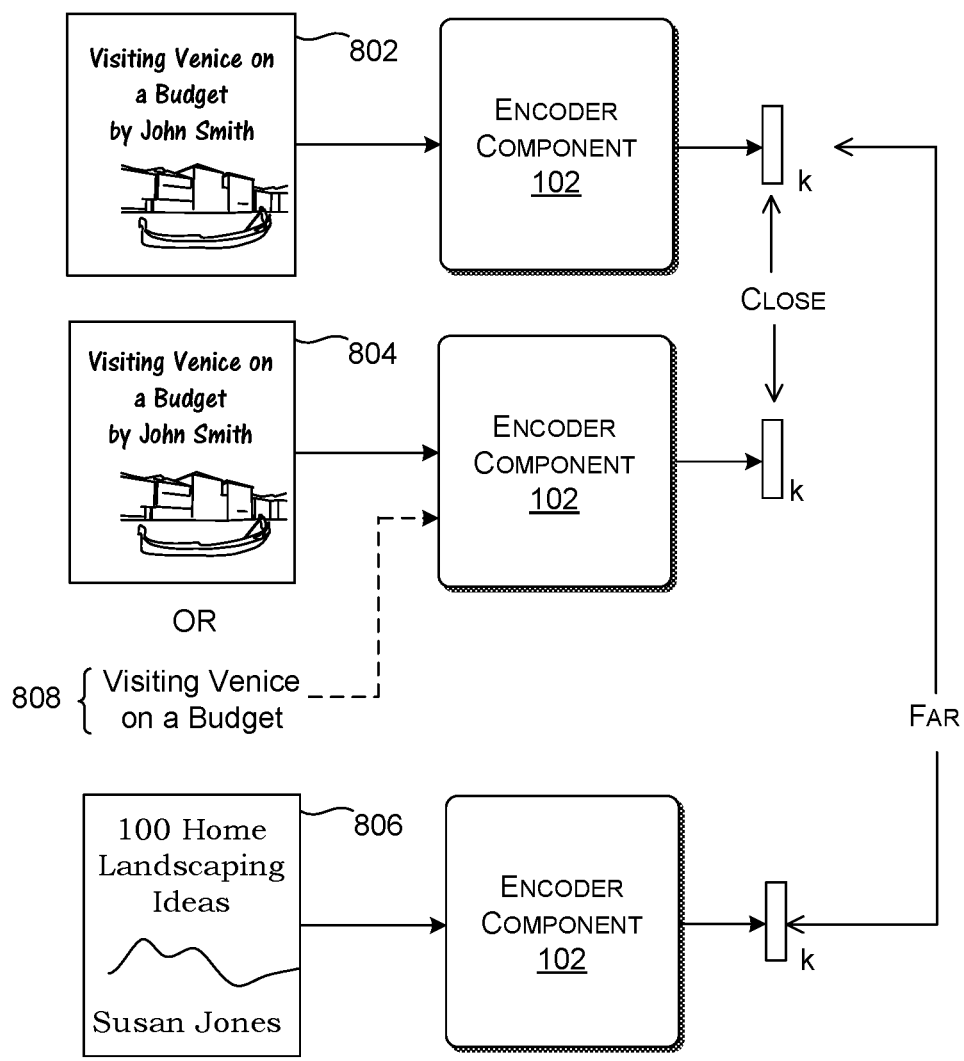
FIG. 8 demonstrates the operation of the training environment with respect to a triple that includes a query item, a positive item, and a negative item.

In this equation, q refers to an input TF vector associated with a query item, p refers to an input TF vector associated with a positive item, and n refers to an input TF vector associated with a negative item. $f(\cdot)$ refers to the end-to-end transformation produced by the TF-modifying component 116 and the projection component 122 described above, to produce an embedding vector. In applying this equation over a large number of training examples, the training component 106 attempts to minimize the distance between each query item and its corresponding positive item (which is associated with the first squared difference term in the equation), and attempts to maximize the distance between each query item and its corresponding negative item (which is associated with the second squared difference term of the equation). The training component 106 can use any machine learning technique to perform these iterative operations, such as Stochastic Gradient Descent. The symbol corresponds to a parameter value that causes the training component 106 to ignore cases in which the (q, p) difference term is only marginally larger than the (q, n) difference term. In one non-limiting implementation, $\xi=-0.1$ FIG. 8 shows an example of the above equation as applied to an illustrative triplet composed of a query item 802, a positive item 804, and a negative item 806. The query item 802 corresponds to an image of a book cover. The positive item 804 corresponds to another image of the same book cover. And the negative item 806 corresponds to an image of a different book cover with respect to the query item. Again, the example-providing component 128 can extract text from each of these images using optical character recognition.

In another implementation, any pairing of items can mix information obtained from different sources. For example, the query item 802 can correspond to an image of the cover of a book, while a positive item 808 can correspond to the title of the same book obtained from some source other than an image. For instance, the example-providing component 128 can extract the positive item 808 from a product page associated with the book.

B. Illustrative Processes

FIGS. 9 and 10 show processes (902, 1002) that explain the operation of the computing environment of Section A in flowchart form. Since the principles underlying the operation of the computing environment have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 9 shows a process 902 that summarizes the operation of the production environment 110 of FIG. 1. In block 904, the encoder component 102 receives an instance of input text in response to an action taken by a user using a user computing device. For example, the user's action may correspond to any of manually inputting the input text on a key input device, manually selecting preexisting text, capturing an image which contains the input text, etc. In block 906, the encoder component 102 generates an input TF vector 114 of dimension g that includes frequency information relating to frequency of occurrence of terms in the input text. The input TF vector corresponds to an n-hot vector that includes a dimension for each term in the input text. In block 908, the encoder component uses the TF-modifying component 116 to modify the frequency information in the input TF vector 114, associated with respective terms, by respective machine-trained weighting factors, to produce an intermediate vector 118 of dimension g. In block 910, the encoder component 102 uses a projection component 122 to project the intermediate vector 118 of dimension g into an embedding vector 124 of dimension k, where k<g (more specifically, k<<g). The embedding vector corresponds to a dense vector that provides a distributed dense (compact) representation of semantic information in the input text. In one implementation, a first neural network implements the TF-modifying component 116 and a second neural network implements the projection component 122. In block 912, an application component utilizes the embedding vector 124 to produce an output result. In block 914, the application component 134 provides the output result to an output device of the user computing device.

FIG. 10 shows a process 1002 that summarizes the operation of the training environment 104 of FIG. 1. In block 1004, the example-providing component 128 collects a plurality of training examples, the training examples including query items, positive items, and negative items. Each positive item has a positive relationship with an identified query item, and each negative item has a negative relationship with an identified query item. The example-providing component 128 can also generate input TF vectors for each query item, positive item, and negative item, if not already provided. In block 1006, the training component 106 produces the machine-trained model 108 by iteratively decreasing distances between embedding vectors associated with query items and their associated positive items, and iteratively increasing distances between embedding vectors associated with query items and their associated negative items.

C. Representative Computing Functionality

Figure 11:
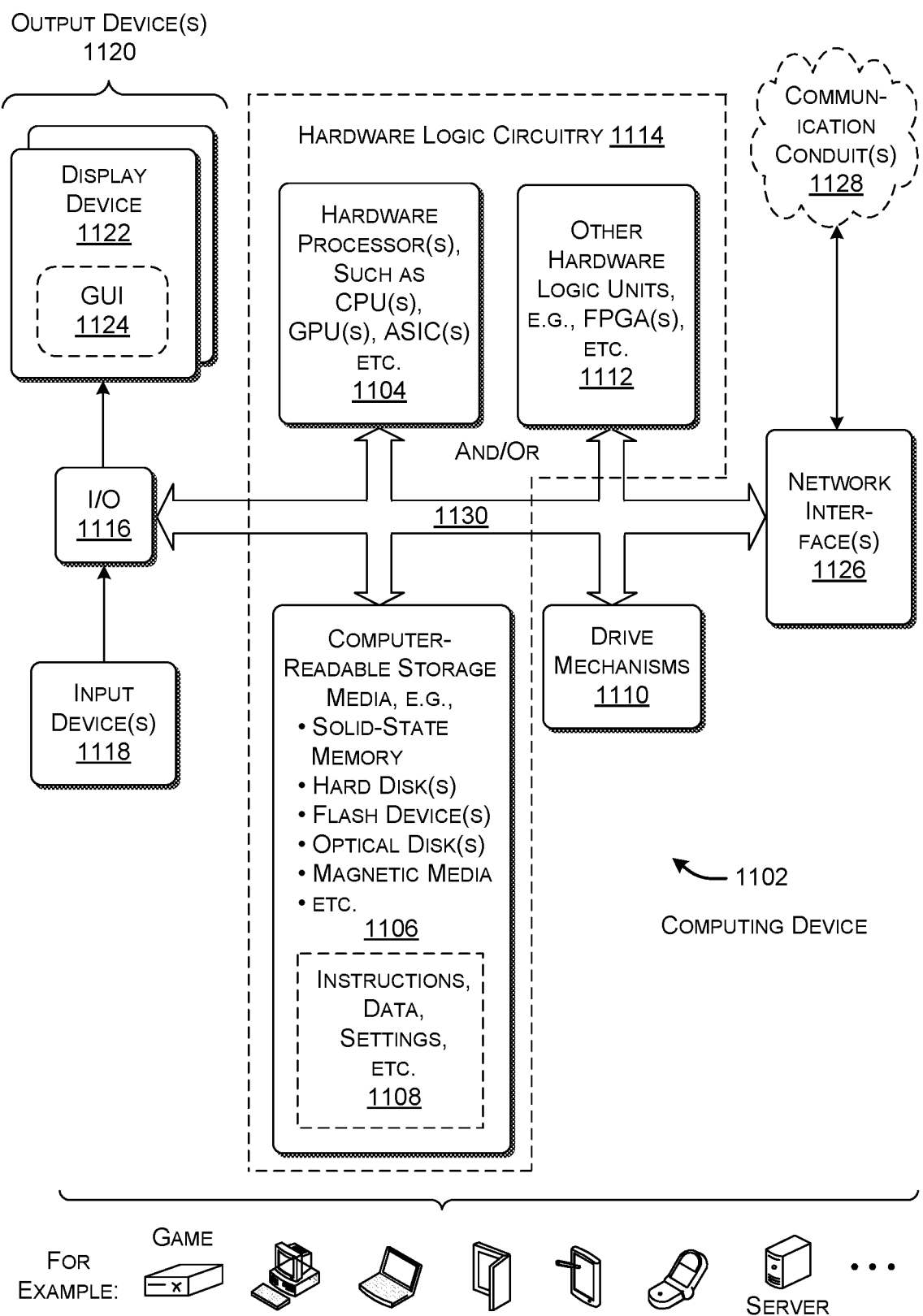
FIG. 11 shows an illustrative type of computing device that can be used to implement any aspect of the features shown in the foregoing drawings.

FIG. 11 shows a computing device 1102 that can be used to implement any aspect of the mechanisms set forth in the above-described figures. For instance, with reference to FIG. 3, the type of computing device 1102 shown in FIG. 11 can be used to implement any server or any user computing device, etc. In all cases, the computing device 1102 represents a physical and tangible processing mechanism.

The computing device 1102 can include one or more hardware processors 1104. The hardware processor(s) 1104 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, for instance, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing device 1102. Further, any instance of the computer-readable storage media 1106 may provide volatile or non-volatile retention of information.

The computing device 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 also includes one or more drive mechanisms 1110 (such as a hard drive mechanism) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the processes described in Section B.

Alternatively, or in addition, the computing device 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing device 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s).

In some cases (e.g., in the case in which the computing device 1102 represents a user computing device), the computing device 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1102 can also include one or more network interfaces 1126 for exchanging data with other devices via one or more communication conduits 1128. One or more communication buses 1130 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing device 1102 as being composed of a discrete collection of separate units. In some cases, the collection of units may correspond to discrete hardware units provided in a computing device chassis having any form factor. FIG. 11 shows illustrative form factors in its bottom portion. In other cases, the computing device 1102 can include a hardware logic unit that integrates the functions of two or more of the units shown in FIG. 11. For instance, the computing device 1102 can include a system on a chip (SoC or SOC), corresponding to an integrated circuit that combines the functions of two or more of the units shown in FIG. 11.

The following summary provides a non-exhaustive set of illustrative aspects of the technology set forth herein.

According to a first aspect, one or more computing devices are described for processing an instance of text. The computing device(s) include: hardware logic circuitry, the hardware logic circuitry including: (a) one or more hardware processors that perform operations by executing machine-readable instructions stored in a memory, and/or (b) one or more other hardware logic units that perform operations using a task-specific collection of logic gates. The operations include: receiving an instance of input text in response to an action taken by a user using a user computing device; generating an input term-frequency (TF) vector that includes frequency information relating to frequency of occurrence of terms in the input text, the input TF vector corresponding to an n-hot vector that includes a dimension for each term in the input text; using a TF-modifying neural network to modify the frequency information in the input TF vector, associated with respective terms, by respective machine-trained weighting factors, to produce an intermediate vector, the TF-modifying neural network being implemented by the hardware logic circuitry and including at least one layer of neurons; using a projection neural network to project the intermediate vector into an embedding vector having a dimensionality that is less than a dimensionality of the input TF vector, the embedding vector providing a distributed compact representation of semantic information in the input text, the projection neural network being implemented by the hardware logic circuitry and including at least one layer of neurons; utilizing the embedding vector to produce an output result; and providing the output result to an output device of the user computing device.

According to a second aspect, the TF-modifying neural network applies a diagonal weighting matrix.

According to a third aspect, at least one machine-trained weighting factor applied to a term by the TF-modifying neural network is negative, which represents a negative emphasis on the term.

According to a fourth aspect, the projection neural network is a fully-connected neural network that applies a full weighting matrix.

According to a fifth aspect, the operation of utilizing includes finding one or more candidate items, each of which has a candidate embedding vector having a prescribed relation to the embedding vector associated with the input text in a vector space. The output result conveys information regarding the candidate item(s) to the user.

According to a sixth aspect, relating to the fifth aspect, the operation of finding uses a nearest neighbor search technique to identify the candidate item(s).

According to a seventh aspect, relating to the fifth aspect, each candidate item corresponds to a candidate product described by the input text.

According to an eighth aspect, relating to the fifth aspect, each candidate item corresponds to a candidate product that is complementary to a product described by the input text.

According to a ninth aspect, the operation of receiving includes: receiving an image of a product taken by the user using a digital camera; and using optical character recognition to convert the image into the input text.

According to a tenth aspect, relating to the ninth aspect, the operation of utilizing includes classifying the image based at least on the embedding vector.

According to an eleventh aspect, relating to the tenth aspect, the operations further include using a machine-trained image-encoding component, implemented by the hardware logic circuitry, to convert the image into an image-based embedding vector. Further, the operation of classifying uses a machine-trained model to classify the image based on the embedding vector associated with the input text and the image-based embedding vector.

According to a twelfth aspect, the operation of utilizing includes: combining the embedding vector with another embedding vector that provides a distributed compact representation of input information, to produce a combined vector; and performing analysis based on the combined vector.

According to a thirteenth aspect, the TF-modifying neural network and the projection neural network operate based on a machine-trained model produced by a training environment. The training environment produces the machine-trained model by: collecting a plurality of training examples, the training examples including query items, positive items, and negative items, wherein each positive item has a positive relationship with an identified query item, and each negative item has a negative relationship with an identified query item; and producing the machine-trained model by iteratively decreasing distances between embedding vectors associated with query items and their associated positive items, and iteratively increasing distances between embedding vectors associated with query items and their associated negative items.

According to a fourteenth aspect, relating to the thirteenth aspect, the operation of collecting includes collecting the query items, positive items, and negative items from a relational knowledgebase, the relational knowledgebase providing nodes associated with entities and links associated with relationships among the entities.

According to a fifteenth aspect, relating to the thirteenth aspect, the operations further include identifying a subset of hard negative items that meet a prescribed test of relatedness to respective query items, but are nonetheless not considered matches for those respective query items. The operation of producing uses the hard negative items to generate the machine-trained model.

According to a sixteenth aspect, relating to the fifteenth aspect, the prescribed test of relatedness assesses relatedness using term-frequency (TF) inverse-document-frequency (IDF) information.

According to a seventeenth aspect, relating to the fifteenth aspect, the prescribed test of relatedness assesses relatedness using a partially-trained version of the machine-trained model.

According to an eighteenth aspect, a method is described, implemented by one or more computing devices, for processing an instance of text. The method includes: receiving an instance of input text in response to an action taken by a user using a user computing device; generating an input term-frequency (TF) vector that includes information relating to frequency of occurrence of terms in the input text, the input TF vector corresponding to an n-hot vector that includes a dimension for each term in the input text; using a TF-modifying neural network to modify the frequency information in the input TF vector, associated with respective terms, by respective machine-trained weighting factors, to produce an intermediate vector, the TF-modifying neural network applying a diagonal weighting matrix which includes at least one negative weighting factor, the TF-modifying neural network being implemented by the computing device(s) and including at least one layer of neurons; using a projection neural network to project the intermediate vector into an embedding vector having a dimensionality that is less than a dimensionality of the input TF vector, the embedding vector providing a distributed compact representation of semantic information in the input text, the projection neural network applying a full weighting matrix, the projection neural network being implemented by the computing device(s) and including at least one layer of neurons; utilizing the embedding vector to produce an output result; and providing the output result to an output device of the user computing device.

According to a nineteenth aspect, relating to the eighteenth aspect, the operation of utilizing includes finding one or more candidate items, each of which has a candidate embedding vector having a prescribed relation to the embedding vector associated with the input text in a vector space. The output result conveys information regarding the candidate item(s) to the user.

According to a twentieth aspect, a computer-readable storage medium for storing computer-readable instructions is described. The computer-readable instructions, when executed by one or more hardware processors, perform a method that includes: receiving an instance of input text in response to an action taken by a user using a user computing device; generating an input term-frequency (TF) vector that includes information relating to frequency of occurrence of terms in the input text; using a TF-modifying neural network to modify the frequency information in the input TF vector, associated with respective terms, by respective machine-trained weighting factors, to produce an intermediate vector, the TF-modifying neural network including at least one layer of neurons; using a projection neural network to project the intermediate vector into an embedding vector having a dimensionality that is less than a dimensionality of the input TF vector, the embedding vector providing a distributed compact representation of semantic information in the input text, the projection neural network including at least one layer of neurons; utilizing the embedding vector to produce an output result; and providing the output result to an output device of the user computing device. The TF-modifying neural network and the projection neural network operate based on a machine-trained model produced by a training environment. The training environment produces the machine-trained model by: collecting a plurality of training examples, the training examples including query items, positive items, and negative items, wherein each positive item has a positive relationship with an identified query item, and each negative item has a negative relationship with an identified query item; and producing the machine-trained model by iteratively decreasing distances between embedding vectors associated with query items and their associated positive items, and iteratively increasing distances between embedding vectors associated with query items and their associated negative items.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for processing an instance of text, comprising:
   hardware logic circuitry, the hardware logic circuitry including: (a) one or more hardware processors that perform operations by executing machine-readable instructions stored in a memory, and/or (b) one or more other hardware logic units that perform operations using a task-specific collection of logic gates, the operations including:
   receiving an instance of input text in response to an action taken using a user computing device;
   generating an input term-frequency (TF) vector that includes frequency information relating to frequency of occurrence of terms in the input text, the input TF vector corresponding to a vector having a prescribed dimensionality and having a plurality of TF values, each dimension of the input TF vector corresponding to a term in a vocabulary of predetermined size;
   using a TF-modifying neural network to modify the frequency information in the input TF vector, associated with respective terms in the vocabulary, by respective machine-trained weighting factors associated with respective dimensions of the input TF vector, to produce an intermediate vector having a same dimensionality as the input TF vector, the TF-modifying neural network operating by modifying each particular TF value in the input TF vector by a corresponding machine-trained weighting factor that is specifically associated with the particular TF value, the TF-modifying neural network being implemented by the hardware logic circuitry and including at least one layer of neurons;
   using a projection neural network to project the intermediate vector into an embedding vector having a dimensionality that is less than the dimensionality of the input TF vector, the embedding vector providing a distributed compact representation of semantic information in the input text, the projection neural network being implemented by the hardware logic circuitry and including at least one layer of neurons; and
   utilizing the embedding vector to produce an output result that is accessible by the user computing device.

2. The one or more computing devices of claim 1, wherein the TF-modifying neural network applies a diagonal weighting matrix having a diagonal that includes the respective machine-trained weighting factors with the respective dimensions of the input TF vector.

3. The one or more computing devices of claim 1, wherein at least one machine-trained weighting factor applied to a term by the TF-modifying neural network is negative, which represents a negative emphasis on the term.

4. The one or more computing devices of claim 1, wherein the projection neural network is a fully-connected neural network that applies a full weighting matrix.

5. The one or more computing devices of claim 1, wherein said utilizing comprises:
   finding one or more candidate items, each of which has a candidate embedding vector having a prescribed relation to the embedding vector associated with the input text in a vector space,
   wherein the output result conveys information regarding said one or more candidate items.

6. The one or more computing devices of claim 5, wherein said finding uses a nearest neighbor search technique to identify said one or more candidate items.

7. The one or more computing devices of claim 1, wherein said receiving comprises:
   receiving an image of a product taken using a digital camera; and
   using optical character recognition to convert the image into the input text.

8. The one or more computing devices of claim 7, wherein said utilizing comprises classifying the image based at least on the embedding vector.

9. The one or more computing devices of claim 8, wherein the operations further include:
using a machine-trained image-encoding component, implemented by the hardware logic circuitry, to convert the image into an image-based embedding vector, and
wherein said classifying uses a machine-trained model to classify the image based on the embedding vector associated with the input text and the image-based embedding vector.

10. The one or more computing devices of claim 1, wherein said utilizing includes:
combining the embedding vector with another embedding vector that provides a distributed compact representation of input information, to produce a combined vector; and
performing analysis based on the combined vector.

11. The one or more computing devices of claim 1, wherein the TF-modifying neural network and the projection neural network operate based on a machine-trained model produced by a training environment, and wherein the training environment produces the machine-trained model by:
collecting a plurality of training examples, the training examples including query items, positive items, and negative items, wherein each positive item has a positive relationship with an identified query item, and each negative item has a negative relationship with an identified query item; and
producing the machine-trained model by iteratively decreasing distances between embedding vectors associated with query items and their associated positive items, and iteratively increasing distances between embedding vectors associated with query items and their associated negative items.

12. The one or more computing devices of claim 11, wherein said collecting comprises collecting the query items, positive items, and negative items from a relational knowledgebase, the relational knowledgebase providing nodes associated with entities and links associated with relationships among the entities.

13. The one or more computing devices of claim 11, wherein the operations further include identifying a subset of hard negative items that meet a prescribed test of relatedness to respective query items, but are nonetheless not considered matches for those respective query items,
wherein said producing uses the hard negative items to generate the machine-trained model.

14. The one or more computing devices of claim 13, wherein the prescribed test of relatedness assesses relatedness using term-frequency (TF) inverse-document-frequency (IDF) information.

15. The one or more computing devices of claim 13, wherein the prescribed test of relatedness assesses relatedness using a partially-trained version of the machine-trained model.

16. The method of claim 1, wherein each entry in the intermediate vector is produced by multiplying a given TF value in the input TF vector by a single weighting factor that is associated with the given TF value.

17. The method of claim 1, wherein the TF-modifying neural network produces the intermediate vector by applying a linear transformation to the TF input vector.

18. A method, implemented by one or more computing devices, for processing an instance of text, comprising:
receiving an instance of input text in response to an action taken using a user computing device;
generating an input term-frequency (TF) vector that includes frequency information relating to frequency of occurrence of terms in the input text, the input TF vector corresponding to a vector having a prescribed dimensionality and having a plurality of TF values, each dimension of the input TF vector corresponding to a term in a vocabulary of predetermined size;
using a TF-modifying neural network to modify the frequency information in the input TF vector, associated with respective terms, by respective machine-trained weighting factors associated with respective dimensions as the input TF vector, to produce an intermediate vector having a same dimensionality as the input TF vector,
the TF-modifying neural network applying a diagonal weighting matrix having a diagonal that includes the machine-trained weighting factors associated with the respective dimensions of the input TF vector, and which includes at least one negative weighting factor, the TF modifying neural network operating by modifying each particular TF value in the input TF vector by a respective machine-trained weighting factor in the diagonal that is specifically associated with the particularly TF value, the TF-modifying neural network being implemented by said one or more computing devices and including at least one layer of neurons;
using a projection neural network to project the intermediate vector into an embedding vector having a dimensionality that is less than a dimensionality of the input TF vector, the embedding vector providing a distributed compact representation of semantic information in the input text,
the projection neural network applying a full weighting matrix, the projection neural network being implemented by said one or more computing devices and including at least one layer of neurons; and
utilizing the embedding vector to produce an output result that is accessible by the user computing device.

19. The method of claim 18, wherein said utilizing comprises:
finding one or more candidate items, each of which has a candidate embedding vector having a prescribed relation to the embedding vector associated with the input text in a vector space,
wherein the output result conveys information regarding said one or more candidate items.

20. A computer-readable storage medium for storing computer-readable instructions, one or more hardware processors executing the computer-readable instructions to perform a method that comprises:
receiving an instance of input text in response to an action taken using a user computing device;
generating an input term-frequency (TF) vector that includes frequency information relating to frequency of occurrence of terms in the input text, the TF vector corresponding to a vector having a prescribed dimensionality and having a plurality of TF values, each dimension of the input TF vector corresponding to a term in a vocabulary of predetermined size;
using a TF-modifying neural network to modify the frequency information in the input TF vector, associated with respective terms, by respective machine-trained weighting factors associated with respective dimensions of the input TF vector, to produce an intermediate vector having a same dimensionality as the input TF vector, the TF-modifying neural network operating by modifying each particular TF value in the input TF vector by a corresponding machine-trained weighting factor that is specifically associated with the particular TF value, the TF-modifying neural network including at least one layer of neurons; and using a projection neural network to project the intermediate vector into an embedding vector having a dimensionality that is less than the dimensionality of the input TF vector, the embedding vector providing a distributed compact representation of semantic information in the input text, the projection neural network including at least one layer of neurons, the TF-modifying neural network and the projection neural network operating based on a machine-trained model produced by a training environment, the training environment producing the machine-trained model by:

collecting a plurality of training examples, the training examples including query items, positive items, and negative items, wherein each positive item has a positive relationship with an identified query item, and each negative item has a negative relationship with an identified query item; and producing the machine-trained model by iteratively decreasing distances between embedding vectors associated with query items and their associated positive items, and iteratively increasing distances between embedding vectors associated with query items and their associated negative items.

* * * * *